T. G. BENNETT.

Assignor to WINCHESTER REPEATING ARMS CO.

Machine for Trimming Cartridge Shells.

No. 9,566. Reissued Feb. 15, 1881.

Witnesses;
Fred. G. Dieterich
Walter Fowler,

Inventor:
Thomas G. Bennett.
by Dodgerson,
Attyg.

N. PETERS, PHOTO-LITHOGRAPHER, WASHINGTON, D. C.

UNITED STATES PATENT OFFICE.

THOMAS G. BENNETT, OF NEW HAVEN, CONNECTICUT, ASSIGNOR TO WINCHESTER REPEATING ARMS COMPANY, OF SAME PLACE.

MACHINE FOR TRIMMING CARTRIDGE-SHELLS.

SPECIFICATION forming part of Reissued Letters Patent No. 9,566, dated February 15, 1881.

Original No. 236,142, dated January 4, 1881. Application for reissue filed January 17, 1881.

*To all whom it may concern:*

Be it known that I, THOMAS G. BENNETT, of New Haven, in the county of New Haven and State of Connecticut, have invented certain new and useful Improvements in Machines for Trimming Cartridge-Shells; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to machines for automatically trimming the heads or flanges of metallic cartridge-shells; and the invention consists in a rotating disk and guide or equivalent devices for imparting to the shells a rotary motion as they are carried along, and a rapidly-revolving cutter arranged to operate upon and trim the flanges of the shells while being thus rotated.

It further consists in combining with the above a friction-disk for automatically feeding the shells to the trimmer, all as hereinafter more fully set forth.

Figure 1:
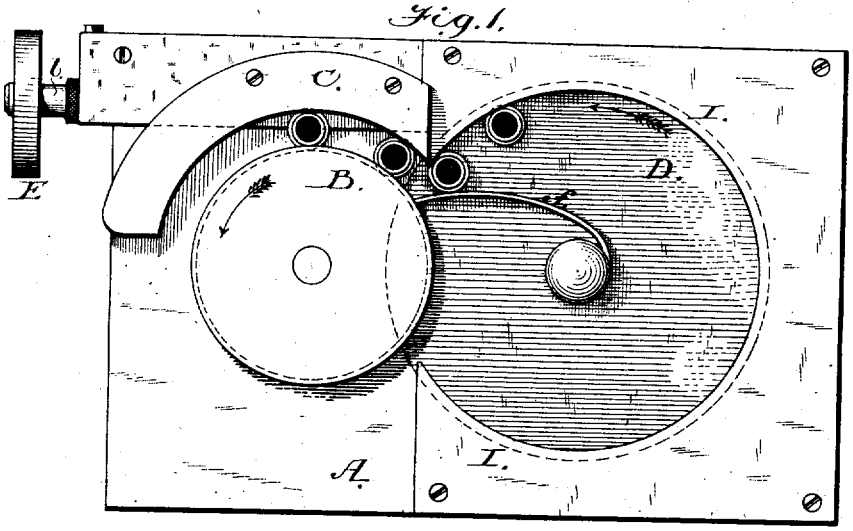
Figure 2:
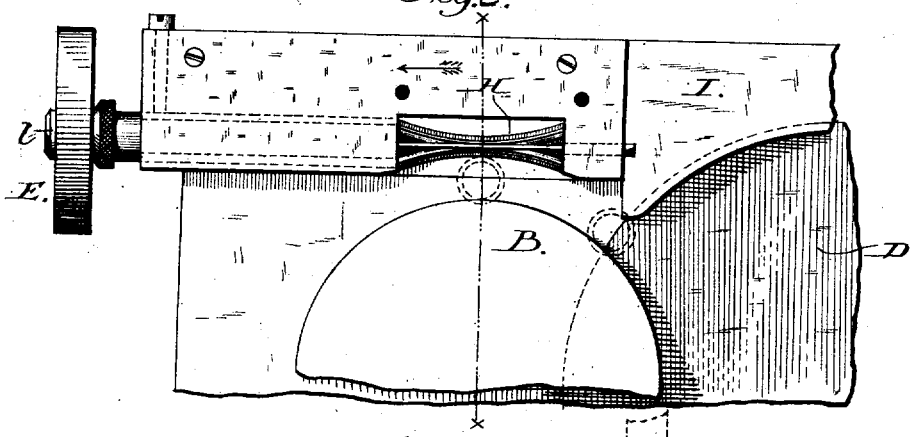

Figure 1 is a top-plan view of the apparatus. Fig. 2 is a similar view of a part of the apparatus, somewhat enlarged, with the guide-plate removed in order to show the position of the cutter; and Fig. 3 is a transverse vertical section on the line *x x* of Fig. 2.

It is desirable—in fact necessary—that the heads or flanges of metallic cartridge-shells shall be of a uniform diameter, or as nearly so as possible. In practice it is found difficult, if not impossible, to make them so by the ordinary process of heading them in dies, and it is often necessary to gage them and select those which are too large for the gage and give them a special operation of trimming, thus involving the two operations of gaging and trimming. Moreover, it is difficult by the ordinary heading process to make heads uniformly concentric.

Figure 3:
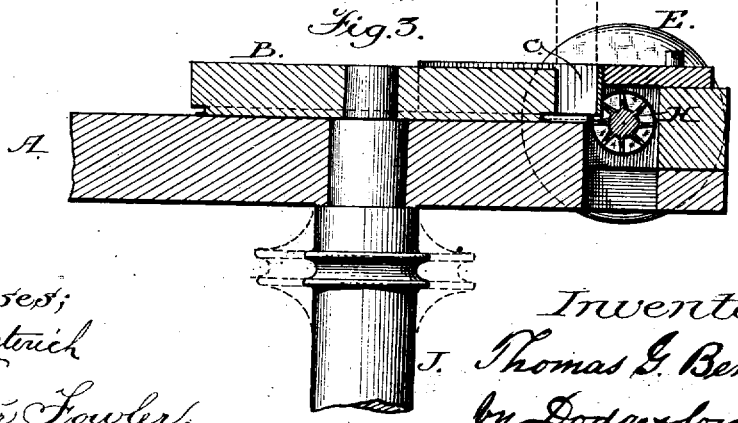

The object of this invention is to produce a machine which will automatically trim the heads of the shells in such a manner as to render them uniformly concentric and of uniform diameter. In order to do this I make the machine as follows:

Upon any suitable style of frame is mounted a top or table, A, on which is located a horizontally-rotating disk, B, which, as shown in Fig. 3, is secured to and driven by a vertical shaft, J, the lower edge of this disk B either having a small recess for the flange of the shell to rest in as it is fed along, or the disk being elevated above the table sufficiently to permit the flange to pass under it, the former plan being shown in Fig. 3 and by dotted lines in Figs. 1 and 2. A curved guide-plate, C, is secured concentrically around one edge of this disk B, as shown in Fig. 1, it also having a corresponding recess for the flange of the shell at its lower edge, the guide C being set at such a distance from the edge of the disk as to leave a space of the proper width to permit the shells, when standing vertically, to be rolled along between the edge of the disk and the adjoining face of the guide-plate C, as represented in Fig. 1, the shells being rotated and carried along through the passage-way by the friction of the rotating disk B.

Underneath the guide-plate C, I locate a revolving cutter, H, as shown in Figs. 2 and 3, this cutter having its cutting blades or teeth so formed as to have their edges concentric with the edge of the disk B, as shown in Fig. 2, so that as the shells are rolled along past it its teeth will operate upon the projecting edge of the flange and trim it to a uniform size. This cutter H is secured upon a shaft, *l*, mounted in suitable bearings, as indicated by dotted lines in Fig. 2, in such a manner that it can be adjusted to the exact position required, and is driven by a pulley, E, at a high speed.

In order to feed the shells to the operating devices above described, I arrange a friction-dial, D, in the position shown in Fig. 1, its upper face being arranged on a level with the top A, so that the shells will pass readily from it into the space between the disk B and the guide-plate C, as indicated in Figs. 1 and 2. The feed-dial D is surrounded by a raised piece, I, which forms an exterior guide, and there is also a curved guide, *f*, arranged as shown in Fig. 1, these two guides thus serving to direct the shells, which are set loosely on the dial D, to the entrance between the friction-disk B and the guide C, by which they are rolled along past the cutter H. By these means I produce an exceedingly simple and cheap machine, which is automatic in its operation on the shells, it only being necessary to set the shells on the feed-dial D, which can be done by a girl or a boy. By causing the shells to rotate on their axes as they are carried along past the rapidly-revolving cutter H, the entire circumference of their flanges will be brought around next to the cutter, which will cut away all eccentric or improperly projecting parts, thus reducing them all to a perfectly uniform diameter and rendering the heads perfectly concentric with the bodies of the shells.

Motion is given to the disks B D and the cutter H by any suitable means, the disk B being made to move at greater speed than the feed-disk D, so that the shells shall be fed in one at a time between the disk B and guide C, and thus be separated more or less, as shown in Fig. 1. By this means the shells are rolled freely along without rubbing against or coming in contact with each other.

It will be observed that, as shown in dotted lines in Fig. 3, the pulley which drives the feed-disk D is much larger than that on the shaft J of disk B, and that, consequently, if belted together, the disk B will revolve at greater speed than the disk D.

By passing all the shells through a machine of this kind they will all be made uniform, those of the right size passing through without being trimmed, while those which are too large or eccentric will be reduced to the proper size and form, and thus a great saving of time and labor will be effected, besides insuring that no shells of improper size or form shall be turned out.

It is obvious that instead of a disk and curved guide devices may be substituted which will feed the shells along in a right line, in which case the edge of the teeth of the cutter might be made straight instead of curved. As substitutes for the disk B and guide C, I will mention a straight guide with an endless metallic belt or chain arranged to pass around pulleys and supported by a rigid guide or back placed parallel with the guide over the cutter, as it is obvious that by these means the shells could be rolled along in a straight line. The disk and curved guide are, however, preferred, as they are simpler and cheaper to make and will operate with great accuracy.

Having thus described my invention, what I claim is—

1. In combination with the rotating disk B and guide C, or equivalent devices for rotating and feeding the shells along, a revolving cutter, H, for trimming the flanges of the shells, the combination being substantially such as herein described.

2. In combination with the rotating disk B, guide C, and cutter H, or equivalent devices, the friction-dial D, with its guides I and *f*, the whole being constructed and arranged to operate substantially as and for the purposes set forth.

In testimony whereof I affix my signature in presence of two witnesses.

THOMAS G. BENNETT.

Witnesses:
GEO. E. ALBEE,
P. G. SANFORD.